United States Patent
Jesurum (10) Patent No.: US 10,414,197 B2
(45) Date of Patent: Sep. 17, 2019

(54) CHECK FRAUD PREVENTION METHOD

(71) Applicant: Jesurum Scientific Enterprises, Inc., Rye, NH (US)

(72) Inventor: Robert M. Jesurum, Rye, NH (US)

(73) Assignee: JESURUM SCIENTIFIC ENTERPRISES, INC., Rye, NH (US)

(*) Notice: Subject to any disclaimer, the term of this patent is extended or adjusted under 35 U.S.C. 154(b) by 0 days.

(21) Appl. No.: 15/710,673

(22) Filed: Sep. 20, 2017

(65) Prior Publication Data
US 2019/0084339 A1    Mar. 21, 2019

(51) Int. Cl.
| | |
|---|---|
| *G06Q 40/00* | (2012.01) |
| *B42D 25/378* | (2014.01) |
| *B42D 25/305* | (2014.01) |
| *B42D 25/29* | (2014.01) |
| *G06Q 20/40* | (2012.01) |
| *G06Q 20/04* | (2012.01) |

(52) U.S. Cl.
CPC ........ *B42D 25/378* (2014.10); *B42D 25/29* (2014.10); *B42D 25/305* (2014.10); *G06Q 20/042* (2013.01); *G06Q 20/4016* (2013.01)

(58) Field of Classification Search
CPC . H04L 63/0407; H04L 63/101; G06Q 20/042; G06Q 20/385; G06Q 50/265
USPC ........................................................ 235/380
See application file for complete search history.

(56) References Cited

U.S. PATENT DOCUMENTS

| | | |
|---|---|---|
| 4,724,309 A | 2/1988 | Greene |
| 6,315,329 B1 | 11/2001 | Greene |
| 7,160,209 B2 | 1/2007 | Marotta et al. |
| 2005/0097046 A1* | 5/2005 | Singfield .............. G06Q 20/042 705/42 |

(Continued)

*Primary Examiner* — Thien M Le
(74) *Attorney, Agent, or Firm* — Lorusso & Associates (57) ABSTRACT

A method to prevent check fraud and to ensure valid negotiable instrument transactions with the use of randomized alphanumeric and special character sequence passwords or passcodes. Check stock is prepared with either serialized or un-serialized check numbers printed on the check stock. Randomized passcodes are generated, one for each check in the check stock. Each of the randomized passcodes is printed on a single check and correlated to a unique check number. A passcode file listing correlated check numbers and passcodes is prepared. Alternatively, the passcode can be maintained physically separate from the check. When a check is presented for payment, the check number and passcode has to be presented to the payor bank that compares the check number/passcode combination to list in the passcode file. If there is no match, or if the match has occurred before concerning another payment, the check is invalidated. The passcodes may be printed on the checks in invisible ink. If invisible ink is used, payee banks process presented checks to render the invisible passcodes visible before transfer to either a check clearing unit, or a payor bank. Alternatively, two sets of randomized passcodes can be created and used with one passcode printed on a check and correlated to the check number and a second passcode maintained physically separate from the check and delivered separately to the check payee for presentment with the check to seek validation and payment.

20 Claims, 8 Drawing Sheets

(56) References Cited

U.S. PATENT DOCUMENTS

| | | | |
|---|---|---|---|
| 2007/0277244 A1* | 11/2007 | de Beasley | H04L 63/101 |
| | | | 726/26 |
| 2012/0162701 A1* | 6/2012 | Villwock | G06F 3/1208 |
| | | | 358/1.15 |
| 2014/0244510 A1* | 8/2014 | de Beasley | G06Q 50/265 |
| | | | 705/44 |

* cited by examiner

CHECK FRAUD PREVENTION METHOD

CROSS-REFERENCE TO RELATED APPLICATIONS

None

FIELD OF THE DISCLOSURE

This disclosure relates to apparatus and methods to secure financial transactions involving negotiable instruments. More particularly, this disclosure relates to security methods to prevent check fraud.

BACKGROUND OF THE DISCLOSURE

Although electronic means for executing financial transactions have increased substantially, paper checks are still used to a considerable extent despite the potential for their fraudulent use. In a typical transaction, a bank customer uses paper checks to make payments. A check is prepared with the necessary information including payee, check amount and authorized signature. The check is forwarded to the payee that endorses and presents the check to the payee's bank for payment. If the issuing bank and payee bank are one and the same, the bank can quickly clear the check and transfer the appropriate amount of funds from the payor's account to the payee's account to the extent there are sufficient funds in the payor's account.

If the payee bank is not the same as the payor's bank, the check, commonly known as a transit check, is presented to the payee's bank for payment. The payee bank forwards the check to a clearing unit such as a federal reserve bank or a private clearing house. The clearing unit forwards the check to the issuing bank for validation and payment. The issuing bank's check processing center processes the check and reports back to the clearing unit. If the check is validated, and sufficient funds are present in the payor's account to cover the check, the clearing unit will retrieve funds from the payor's bank account and deposit the funds in the payee's account.

The traditional check clearing process has been accelerated with the use of scanning technology. Federal legislation passed in 2004, known as the Check Clearing for the 21$^{st}$ Century Act, permits a bank to scan the front and back of a check to create a substitute check that is forwarded electronically to a clearing unit. Although this accelerates the check clearing process, it still involves the need to verify the fundamental components of a check including valid signatures.

Due in part to considerable advancements in paper reproduction and copying technology, perpetrators of fraud can modify what are otherwise valid checks to re-direct funds to fraudulent accounts. Checks, signed with authorized signatures, including those constructed with sophisticated inks, patterns and encrypted data, if intercepted after being sent to a payee, can be photocopied and modified with respect to the payee, check amount and check number fields to create fraudulent, but facially acceptable checks. If intercepted before use by an unauthorized user, the check number field can be modified in an attempt to avoid detection. The modified checks are then presented for deposit in a temporary account. Once the funds are deposited in the account, the funds are wired to one or more offshore accounts, or cash can be withdrawn from the receiving account, before either the payor or payee becomes aware of the fraud. Because checks are typically printed with serialized check numbers, it is easy for a fraud perpetrator to modify a check with a false check number that will not raise suspicion when presented for deposit. The losses borne by banks and bank customers associated with processed fraudulent checks are considerable and run into the billions of dollars annually.

To counter check fraud, many devices and methods have been developed to identify fraudulent checks and reduce overall losses. U.S. Published Patent Application No. 2002/0067827 A1 ('827 application) represents one approach used. The '827 application discloses a check fraud prevention method that utilizes some of the unique information presented on a check. The payee information, check amount and even check number are combined through an algorithm to create a unique identification number. The generated identification number is encrypted and printed onto the check before delivery to the payee. When the payee presents the check for payment to the payee's bank, a proprietary apparatus configured to read the encrypted information is used to verify that the payee, check amount and/or check number are valid.

Although this system has its merits, it requires each bank to purchase the encryption machine to verify the validity of the check. It also requires any party issuing a check to purchase the encryption creation and printing apparatus. This invariably adds considerable expense to the check validation process. In addition to these shortcomings, the information needed to create the encryption is provided on the very check the encryption is intended to protect. As such, the fraud prevention technology is far from foolproof because the passcode is generated from information on the check. If the information is changed, a valid passcode potentially could be generated from the changed information and printed on the modified check.

In another method disclosed in U.S. Pat. No. 6,315,329, unique information printed on a check is encrypted to be read by a Magnetic Ink Character Recognition reader (MICR reader) that reads magnetic ink character recognition designations at the bottom of a check. This too requires the purchase and application of a standardized encryption system and encryption reader. For this system to work, each bank or clearing entity involved in a check transaction has to invest in the proprietary encryption readers. Each check issuer has to purchase the encryption creator. For effective use of this check fraud prevention system, industry-wide adoption is needed to be functional and effective. And like the '827 application, the '329 patent concerns check encryption of data printed on the check. Again, the information needed to potentially create a fraudulent check is presented on the check itself and can be recalculated to match the information on the fraudulent check.

What is needed and what I have developed is a check fraud prevention method that does not require the need for any sophisticated check preparation apparatus, or encryption creation and decoding apparatus, as my method does not require the creation of any encrypted information regarding the particulars of a check. The method does not require any special training with respect to bank employees and can be used industry-wide without the implementation of any sophisticated technology. The technology needed is technology already in place in the banking system. These and other objects of the disclosure will become apparent from a reading of the following summary and detailed description of the disclosure as well as a review of the appended drawings.

SUMMARY OF THE DISCLOSURE

In one aspect of the disclosure, a check fraud prevention method involves the creation of check stock by a printer based upon an order received from either a customer, or the customer's bank. The check stock can be prepared with either serialized or un-serialized check numbers. The printer next uses an off-the-shelf, or Internet-accessible, random passcode generator to create unique passwords or passcodes. As used herein, password and passcode may be used interchangeably to define unique, randomized alphanumeric and/or special character sequences. Each passcode is printed onto one check so that each check has a unique check number and a corresponding unique passcode. The passcode can be any combination of alphanumeric and/or special character sequences prepared to be distinguishable from any other prepared alphanumeric and/or special character sequence. The passcodes are generated randomly to specifically not include any form of codification or encryption of the information data on the checks to prevent the creation and use of algorithms that utilize check data to create the passcodes. Thus, the check stock itself is rendered secure and independent of any data on the check. My method is both simpler to implement and inherently more secure than previous methods.

Once the check stock with printed passcodes has been prepared, the printer forwards the check stock to the customer. Either the printer or the customer creates a paper file and/or an electronic file containing a master list of the check numbers and the corresponding passcodes. The file is forwarded to the customer's bank, or the bank's check processing center, to be stored securely for future check verification purposes.

To make a payment via check, the bank customer prepares a check with the necessary payee, date, payment amount information and authorized signature(s). The prepared check is then sent to the payee. To receive payment, the payee presents the check with the passcode to the payee's bank.

If a check with the passcode is presented to the payee's bank, the payee bank will either send the physical check and passcode information to a clearing unit, or directly to the payor's bank for validation and funds transfer. Alternatively, the payee bank will scan the check and forward it to the clearing unit, or the payor bank via electronic transmission means, e.g., the Internet with the use of an electronic file deposit application such as Dropbox™. The scan will show the unique check number and passcode needed for check verification.

Once the payor bank has the check number and passcode information, the payor bank makes a one-to-one comparison between the presented check and passcode to the check number and passcode listed in the file sent by either the payor/customer, or the check printer. If there is a match and if the check number/password combination has not already been used, funds can be debited from the payor's account electronically and sent either directly to the payee's bank for deposit into the payee's account, or to the clearing unit that will forward the funds to the payee's bank.

If there is a mismatch between the presented check number and passcode to the corresponding data on file, or if the check number/passcode combination has already been used for a previous payment, the payor bank can refuse payment on the basis of an unverified check and inform the clearing unit and/or the payee's bank. The payor bank can also notify the check-issuing customer about the invalid check to permit the customer to determine if the absence of a match is due to fraud or some error on the part of the payee, and to find out whether this check is a substitute for a previously valid check in order to use the information from the original check (in particular, the identity of the intended payee) to aid in a fraud investigation. Although banks review payee information and perform signature verification as a matter of course, the use of unique passcodes in association with check numbers can eliminate the need to verify all the data typically evaluated when processing checks and should eliminate a majority of check fraud events other than those resulting from intercepted, completed checks.

In another aspect of the disclosure, checks prepared by a printer are printed with either serialized or un-serialized numbers and with unique passcodes printed with invisible ink or security ink. The invisible passcodes may be printed on any part of the faces or backs of the checks. The placement of the passcodes on the checks can be standardized within the banking industry for efficiency. The specific location may be selected to avoid covering any data that could be altered or rendered illegible by any chemicals or processes used to render the ink visible. A section of checks also can be reserved for the passcode to protect the integrity and legibility of the passcode. The materials used to print the invisible passcodes can be selected based upon the desired process used to visibly reveal the passcode. The application of heat, chemical and specific light spectrum, e.g., ultra violet light, are known methods used to render visible, data concealed with invisible ink. The material selected to make the passcode invisible should be of a kind that becomes irreversibly visible once the visibility-reversal process is applied.

The steps taken after the checks are created with concealed passcodes are essentially the same as those for checks prepared with visible passcodes with at least one notable exception described below. The checks are delivered to the customer. The correlated check numbers and passcodes are compiled in a file and sent to the customer's bank for retention and later check verification. The customer prepares and endorses checks payable to payees who present the checks to the payees' banks for deposit.

Unlike the prior method involving checks with visible passcodes, the payee bank must first apply the passcode-revealing process before the check is scanned. If a check is received with the passcode already revealed, the check can be flagged as invalid. The check invalidity can be reported to the check clearing unit and/or the payor bank. Alternatively, the invalidity can be reported directly to the payor, or even law enforcement. The remaining steps for the transfer of funds from the payor to the payee are the same as those described for checks bearing visible passcodes.

In a yet further aspect of the disclosure, a second set of randomized passcodes are generated with each second passcode correlated to a unique check number and first randomized passcode. The correlated check numbers and passcodes are listed in a passcode file (paper and/or electronic) used by the payor and the payor's bank. Unlike the first passcode, the second passcode is maintained physically separate from the check and delivered separately to a check payee. The payee must present a check for payment with the second passcode in order for the check to be accepted, validated and paid. In this aspect of the disclosure, the payor bank compares the check number, first passcode on the check and second passcode to the list of correlated check numbers, first passcodes and second passcodes to determine if the check is valid and has not been used for a previous payment transaction.

In a still further aspect of the disclosure, a single set of randomized passcodes are generated and each passcode is correlated to a unique check number. A list of the correlated check numbers and passcodes is compiled and memorialized in a passcode file that can be a paper file, or an electronic file. The passcodes are maintained physically separate from the checks and payments made by check are performed by delivering a check and a passcode separately to a check payee. The payee must present a check for payment with the passcode in order for the check to be accepted, validated and paid. In this aspect of the disclosure, the payor bank compares the check number and the passcode to the list of correlated check numbers and passcodes to determine if the check is valid and has not been used for a previous payment transaction.

With the use of any of these aspects of the disclosure, fraudulent actors cannot photocopy checks and modify the check numbers to create facially acceptable, but unauthorized checks as any change in either the check numbers or passcodes will result in a mismatch with the check numbers and passcodes in the master list that will expose the fraud. Because the passcodes are randomized sequences of alphanumeric and/or special characters, there is no algorithm a perpetrator of fraud could use to create new check numbers with new passcodes. The list of check numbers and passcodes only covers a fixed number of checks regardless whether the check numbers are serialized, un-serialized or random. These and other aspects of the disclosure will become apparent from a review of the appended drawings and a reading of the following detailed description of the disclosure.

DETAILED DESCRIPTION OF DISCLOSURE

Figure 1:
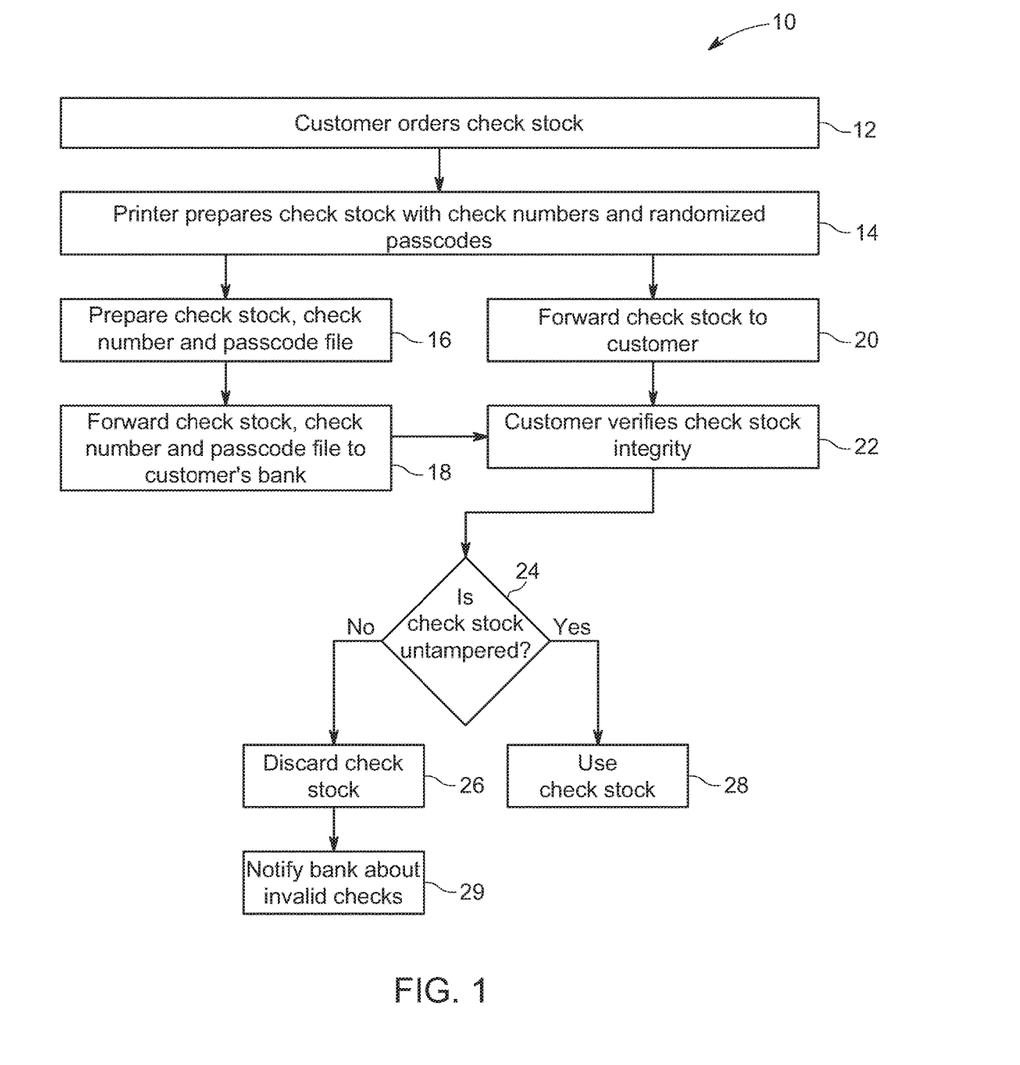
FIG. 1 is a flow diagram of a first phase of a check fraud prevention method according to one embodiment of the disclosure.

In one aspect of the disclosure, a check fraud prevention method is comprised of three interconnected phases. As shown in FIG. 1, in a first phase shown designated generally as 10, check stock printed with serialized, un-serialized, or randomized check numbers, is printed with unique passcodes correlated to the check numbers. The passcodes are printed on either the fronts or backs of the checks. The printed check stock is delivered to a customer for use. In a second phase shown in FIG. 2 and designated generally as 30, the customer fills out a check, delivers the check to a payee and the payee presents the check with the passcode to the payee's bank. In a third phase shown in FIG. 3 and designated generally as 50, the check with printed passcode is sent to the customer's/payor's bank for validation and payment.

Referring again to FIG. 1, a customer orders check stock from a printer at step 12. As used herein, check stock shall mean grouped sets of unsigned and unendorsed checks that have the payee, check amount and/or signature fields blank. The check stock is prepared by a check stock printer with check numbers printed on the checks at step 14. It should be understood the bank can function as the check stock printer. Before the check stock is printed, the printer creates, or obtains, a series of randomized passcodes created with any random passcode generator and selects individual passcodes, each to be printed on single checks. The passcodes are thus included in the finished check stock when the checks are printed. For purposes of efficiency, the selected location of the passcodes on the checks can be standardized to promote efficiency in the check clearing process. The check stock can be prepared with either serialized, un-serialized or randomized check numbers.

For purposes of illustration and not limitation, random unique passcodes can be generated with Norton Identity Safe Password Generator and LastPass Password Generator. It should be understood that the passcodes can be formed from any combination of alphanumeric and special character sequences. Each passcode is associated with one check so that each check has a unique check number and a corresponding unique passcode.

Once the check stock with passcodes has been prepared, the printer forwards the check stock to the customer optionally in a tamperproof package at step 20. The printer also creates a passcode file that lists the check numbers with the correlated passcodes at step 16. The passcode file is forwarded to the customer's bank, or the bank's check processing center, that retains the passcode file as step 18. The passcode file is maintained by the bank for comparison to checks presented for payment by a payee, a payee's bank, or a check clearing unit. Alternatively, the customer can create the passcode file from the information received from the printer and forward the file to the bank.

Once the customer receives the check stock, the package is inspected to ensure the check stock has not been tampered with by any unauthorized party at steps 22 and 24. If the check stock appears to have been compromised, the check stock is discarded at step 26 and the bank is notified, optionally, to discard, or disregard, the passcode file at step 29. If the check stock is acceptable, the check stock is maintained for use at step 28. These steps complete the first phase 10 of the check fraud prevention method. With respect to the issue of check tampering, it should be understood that maintaining the check stock in a secure manner before use is of paramount importance as the unauthorized use of a blank check, e.g., by a rogue employee, would defeat the purpose of the fraud prevention method. The unauthorized check would have the proper check number and passcode combination to be cleared. The only practical way to stop this type of fraud would be for the owner of the check stock, or authorized personnel, to identify the stolen check and report the theft to the payor's bank before the check is cleared.

Figure 2:
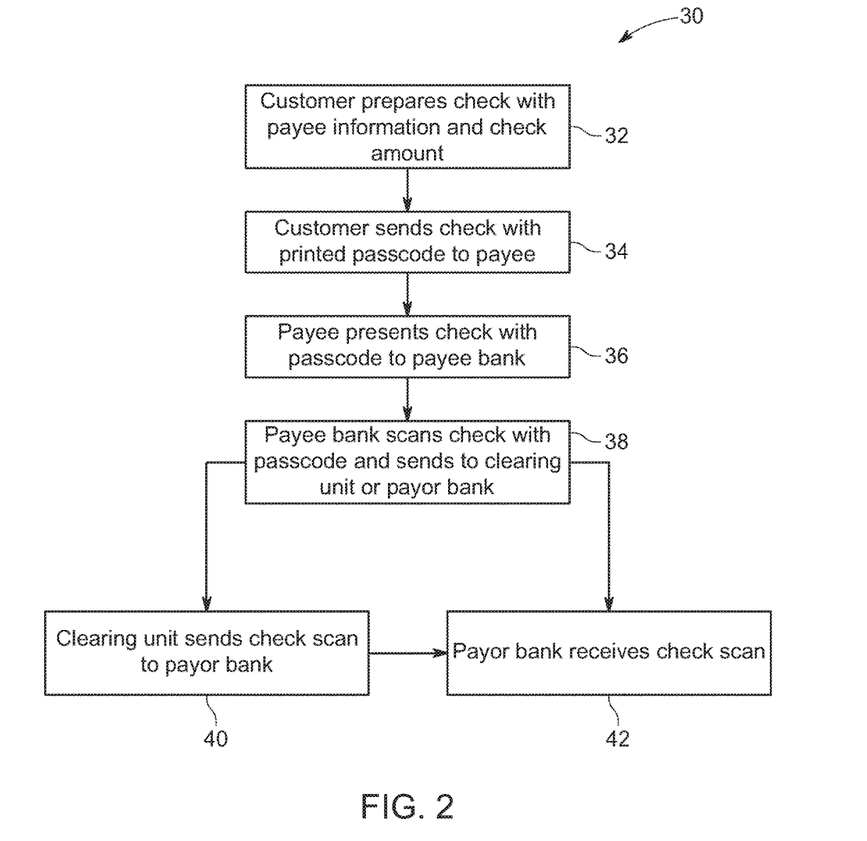
FIG. 2 is a flow diagram of a second phase of a check fraud prevention method according to the embodiment of the disclosure shown in FIG. 1.

Referring to FIG. 2, to make a payment via check and initiate the second phase of the check fraud prevention method, the customer/payor prepares a check with the necessary payee, date and payment amount information at step 32. To complete the check preparation process, the check is signed with an authorized signature or signatures when more than one signature is required to make a check valid and payable. The prepared check with printed passcode is then sent to the payee at step 34. The payee endorses the check and presents the check to the payee's bank at step 36. The payee bank scans the check and sends the scan to either a check clearing unit, or directly to the payor bank for validation and payment at step 38. If sent to a check clearing unit, the clearing unit forwards the scan to the payor bank at step 42. Direct transfer to the payor bank occurs at step 42. These steps complete the second phase 30 of the check fraud prevention method.

It should be noted that as an additional step to the second phase, if the check does not bear a passcode, the payee bank can refuse acceptance of the check on the basis of invalidity. The check information can be reported to the payor bank, the customer/payor and/or to law enforcement for a potential fraud evaluation.

Figure 3:
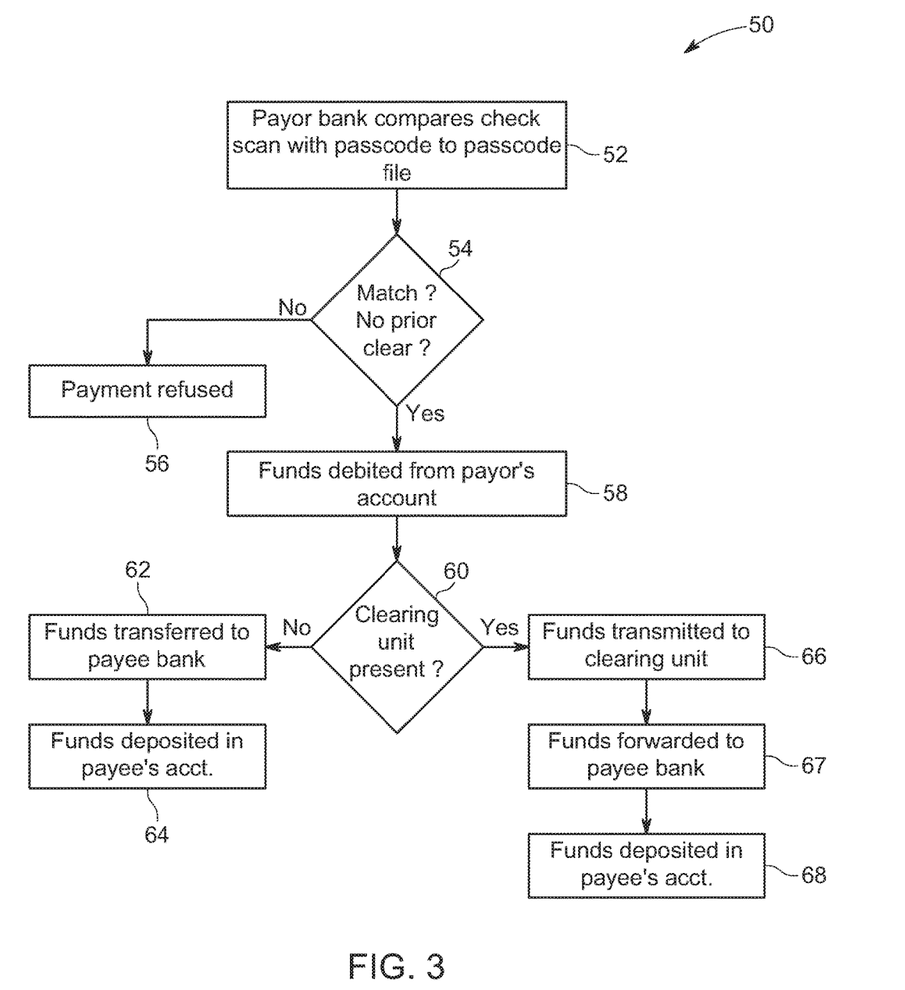
FIG. 3 is a flow diagram of a third phase of a check fraud prevention method according to the embodiment of the disclosure shown in FIG. 1.

Referring now to FIG. 3, to begin the third phase 50 of the check fraud prevention method, once the payor bank has the check number and passcode information, the payor bank makes a one-to-one comparison between the presented check's number and passcode combination to the information stored in the passcode file retained by the payor bank at step 52. The comparison can be performed manually and/or via electronic means with the use of scanning and optical recognition software as is well known in the art. If there is a match at step 54, and all the typical indicia of validity are met, e.g., validated authorized signature(s), sufficiency of payor's funds, etc., funds can be debited from the payor's account at step 58. If there is no clearing unit, the funds can be debited electronically and sent directly to the payee's bank for deposit into the payee's account at steps 62 and 64, if there is no clearing unit at step 60. If there is a clearing unit involved, the funds can be sent to the clearing unit that will forward the funds to the payee's bank at steps 66 and 67. The funds are then deposited into the payee's account at step 68. These steps complete the third phase 50 of the check fraud prevention method when the check is valid.

If the presented check with check number and passcode does not match the data on file or if the check number and passcode have been used previously, the payor bank can refuse payment at step 56 on the basis of an invalidated check and inform the clearing unit and/or the payee's bank. This complete the third phase 50 of the check fraud prevention method when the check is invalid. As an optional, additional step, the payor bank can also notify the check-issuing customer about the invalidated check to permit the customer to determine if the absence of a match is due to fraud or some error on the part of the payee. Because each unique check number is connected to a unique random passcode, someone intending to commit check fraud simply cannot copy a check and change the check number as the new check number will not be connected to the passcode printed on the original check. This makes it impossible for fake checks to be created with fake check numbers. Because the passcode is a randomized passcode, the fraud perpetrator cannot realistically modify the passcode also to create a new check number and passcode combination as the new combination will not be on file with the payor bank. As such, the disclosed check fraud prevention method eliminates a common source of check fraud.

For the embodiment that uses serialized checks, another fraud detection means is presented. Even if a check has a valid check number/passcode combination, a presented check with a check number significantly separated from checks cleared contemporaneously with the subject check can also be used as a basis to flag a potential fraud event. For example, if a payor's bank has recently cleared checks numbering 1-20 and the bank is presented a check with 150 as the check number, the significant difference between the check's number compared to the recently validated and cleared check numbers can be used to flag the check as a potentially fraudulently issued check. This can occur, for example, when a company employee fills out, without authorization, an otherwise valid, unused check taken from the bottom end of an unused or partially used check stack.

The use of a unique randomized passcode with a serialized check number presents an additional novel method to track check fraud unavailable if a unique passcode is not used. Although check numbers can be modified easily in an attempt to commit check fraud, the randomized passcode, practically speaking, cannot be changed without immediately invalidating a modified check. A modified check number will not immediately garner attention during a check clearing evaluation as a numeric check number, in and of itself, will not raise suspicion unless the check number is significantly out of range of contemporaneously cleared checks and the clearing unit notices the discrepancy.

When a check without a unique passcode is falsified with a fake check number, a payor and/or the payor's bank will not have an immediate lead as to what original check was altered. Any check issued contemporaneously with other checks by a payor could be the altered check. The presence on a modified check of a randomized passcode contained in a passcode file will enable the payor to immediately determine the identity of the original payee associated with the passcode number from the payor's payment records. This will enable the payor and/or law enforcement to narrowly focus a fraud investigation to identify the fraud perpetrator by tracking the fraudulent check and using the original payee as a starting focus point. For example, by determining whether the payee ever received the check, the fraud investigation can narrow the investigation to events that took place before a payee should have received the check, if the check was not received. If the check was received, the investigation can look to events that took place between receipt and presentment to a bank.

Figure 4:
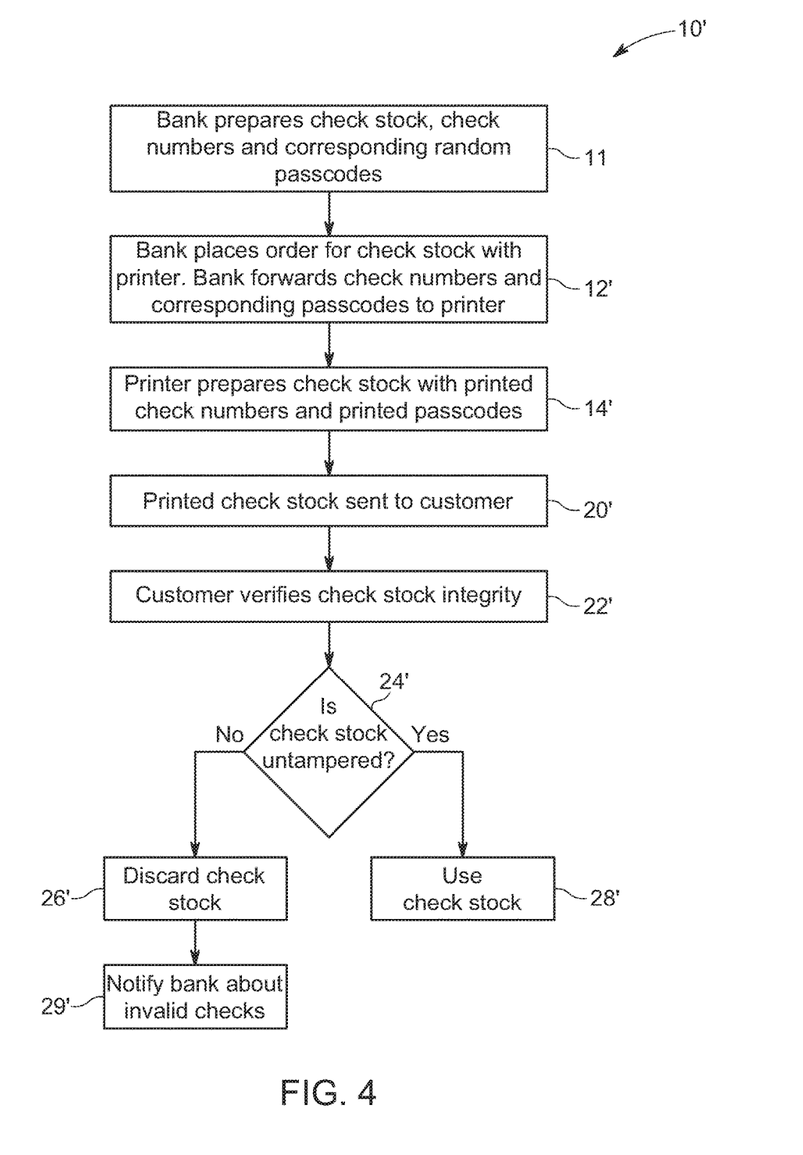
FIG. 4 is a flow diagram of a first phase of a check fraud prevention method according to another embodiment of the disclosure.

Referring now to FIG. 4, in another embodiment of the disclosure, the payor bank initiates the first phase of the check fraud prevention method, designated generally as 10', by generating check numbers and random passcodes at step 11 in the same manner as disclosed at step 14 of first phase embodiment 10. As used herein, a feature of a disclosed method embodiment assigned the same reference character as a feature of a different disclosed embodiment, but with the assigned reference characters having differently primed or unprimed designations, represent different embodiments of the same feature. The random passcodes are generated in the same manner as disclosed in step 14 of the first phase embodiment designated 10.

Following preparation of the check numbers (serialized or un-serialized), and random passcodes, the bank orders check stock from a printer and forwards the check numbers and corresponding random passcodes to the printer at step 12'. The list of check numbers and passcodes can be presented to the printer in a passcode file. The check stock is prepared by a check stock printer with check numbers and passcodes printed on the checks at step 14'.

Once the check stock with passcodes has been prepared, the printer forwards the check stock to the customer optionally in a tamperproof package at step 20'. The passcode file can be sent to the customer with the check stock to facilitate organization of the customer's records. Because the bank created the passcode file, the printer does not have to forward the file back to the customer's bank, or the bank's check processing center, other than to optionally verify that the checks have been printed.

Once the customer receives the check stock, the package is inspected to ensure the check stock has not been tampered with by any unauthorized party at steps 22' and 24'. If the check stock appears to have been compromised, the check stock is discarded at step 26' and the bank is notified, optionally, to discard, or disregard, the passcode file at step 29'. If the check stock is acceptable, the check stock is maintained for use at step 28'. This completes the first phase 10' of this second embodiment of the check fraud prevention method.

The second and third phases of this second embodiment are identical to the second 30 and third 50 phases of the first embodiment shown in FIGS. 2 and 3, respectively. The steps of the second and third phases of the first embodiment are accordingly incorporated here as part of the disclosure of this second embodiment, the first phase of which is shown in FIG. 4.

Figure 5:
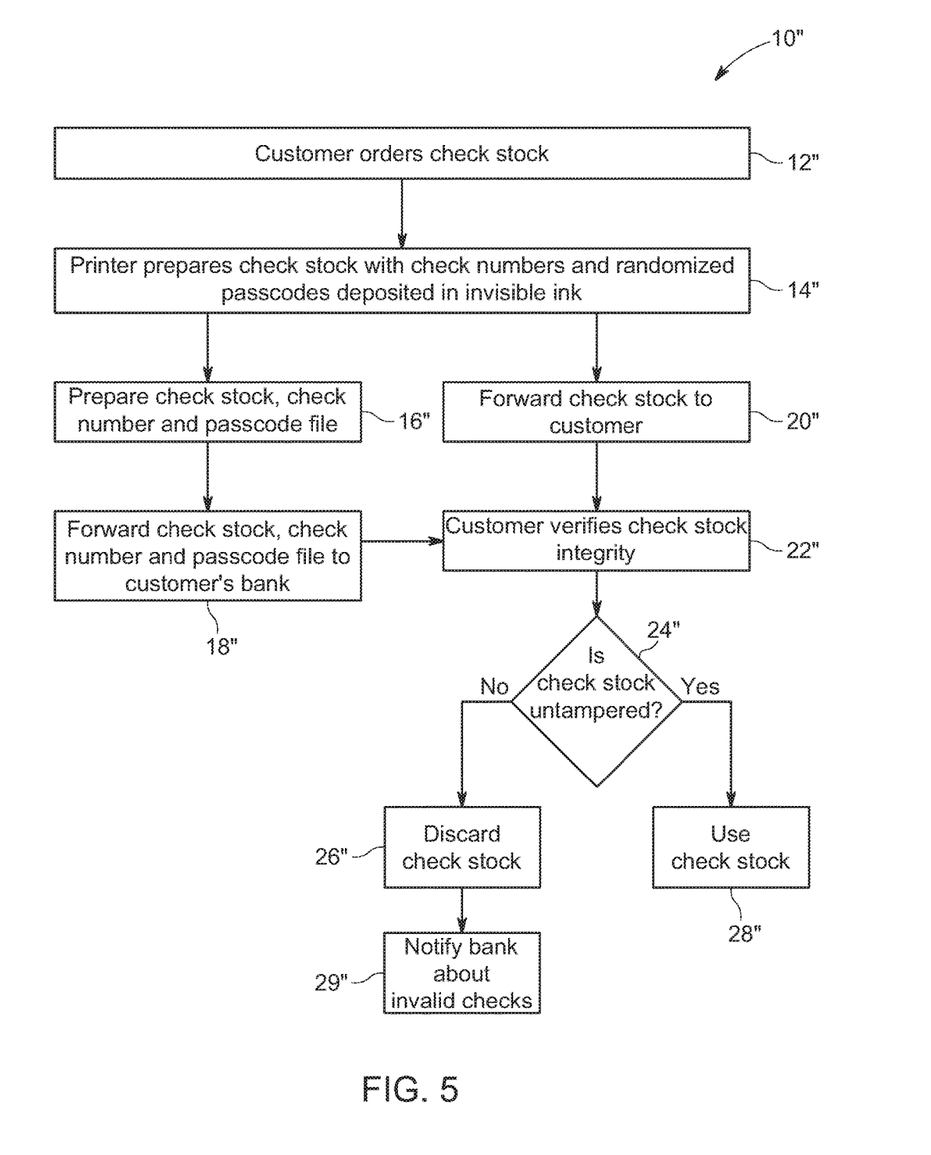
FIG. 5 is a flow diagram of a first phase of a check fraud prevention method according to a further embodiment of the disclosure.

In another aspect of the disclosure as shown in FIG. 5, a first phase of a check fraud prevention method designated generally as 10", incorporates the use of hidden passcodes printed in invisible ink on check stock. For purposes of this embodiment, the ink used to print the passcodes on the checks in an invisible manner can be any known invisible inks that can be made visible with heat, chemical reaction and/or ultraviolet light exposure. Ideally, but not necessarily, the inks should be of types that do not decompose or discolor the check stock paper such as silver nitrate, and do not deposit any chemical materials that could prevent the reproduction of the passcode, after made visible, with scanning equipment. Also, ideally, the ink should be of a kind that requires some form of physical or chemical manipulation to be made visible, such as with the application of, illustratively, phenolphthalein, a known pH indicator that turns pink when applied to a chemically base material. With such an ink, any manipulation of a check prepared in such a manner to expose the passcode, before presentation to a payee bank, immediately would provide an indication of potential fraud.

It should be understood that any invisible ink embodiments disclosed herein are disclosed by way of illustration and not limitation. The use of any invisible ink, or disappearing ink, to print passcodes on a check in an initial invisible manner are deemed within the scope and spirit of this disclosure. The process needed to render invisible ink visible also is not limited to any specific group of processes.

To begin the first phase 10" of this aspect of the disclosure, a customer orders check stock from a printer at step 12". The check stock is prepared by a check stock printer with check numbers printed on the checks at step 14". Before the check stock is printed, the printer obtains a series of randomized passcodes created with any random passcode generator, including those disclosed herein, and selects individual passcodes, each to be printed on single checks in invisible ink, again at step 14". The passcodes are thus included in the finished check stock when the checks are printed, but in a manner not perceivable under ambient conditions with the naked eye, or perceivable with the use of visual aids absent some kind of physical, chemical or spectral-light manipulation of the invisible ink.

The check stock can be prepared with either serialized, un-serialized, or randomized check numbers. It should be understood that the invisible passcodes can be formed from any combination of alphanumeric and special character sequences. Each passcode is associated with one check so that each check has a unique check number and a corresponding unique passcode. It further should be understood that the invisible passcodes can be printed on any part of the fronts and backs of the check stock. The location of the printed invisible passcode can be selected so as not physically interfere with the other information fields on the check. A section of checks can be reserved to receive the passcode so as not to interfere with any of the common information fields on a check and to ensure the information in the common fields does not affect the passcode, e.g., distort or render illegible the passcode when rendered visible. The location may be standardized to promote effective and efficient use of the invisible passcode by the banking industry.

Once the check stock with invisible passcodes has been prepared, the printer forwards the check stock to the customer optionally in a tamperproof package at step 20". The printer also creates a passcode file that lists the check numbers with the correlated passcodes at step 16". This file should be sent to the customer as the customer will not be able to read the passcodes from the check stock and therefore, will not know the check number/passcode combinations. The passcode file also is forwarded to the customer's bank, or the bank's check processing center, that retains the passcode file at step 18". The passcode file is maintained by the bank for comparison to checks presented for payment by a payee, a payee's bank, or a check clearing unit. Alternatively, the customer can forward the passcode file to the bank.

Once the customer receives the check stock with invisible passcodes, the package is inspected to ensure the check stock has not been tampered with by any unauthorized party at steps 22" and 24". If the check stock appears to have been compromised, the check stock is discarded at step 26" and the bank is notified, optionally, to discard, or disregard, the passcode file at step 29". If the check stock is acceptable, the check stock is maintained for use at step 28". This completes the first phase 10" of this aspect of the check fraud prevention method.

Figure 6:
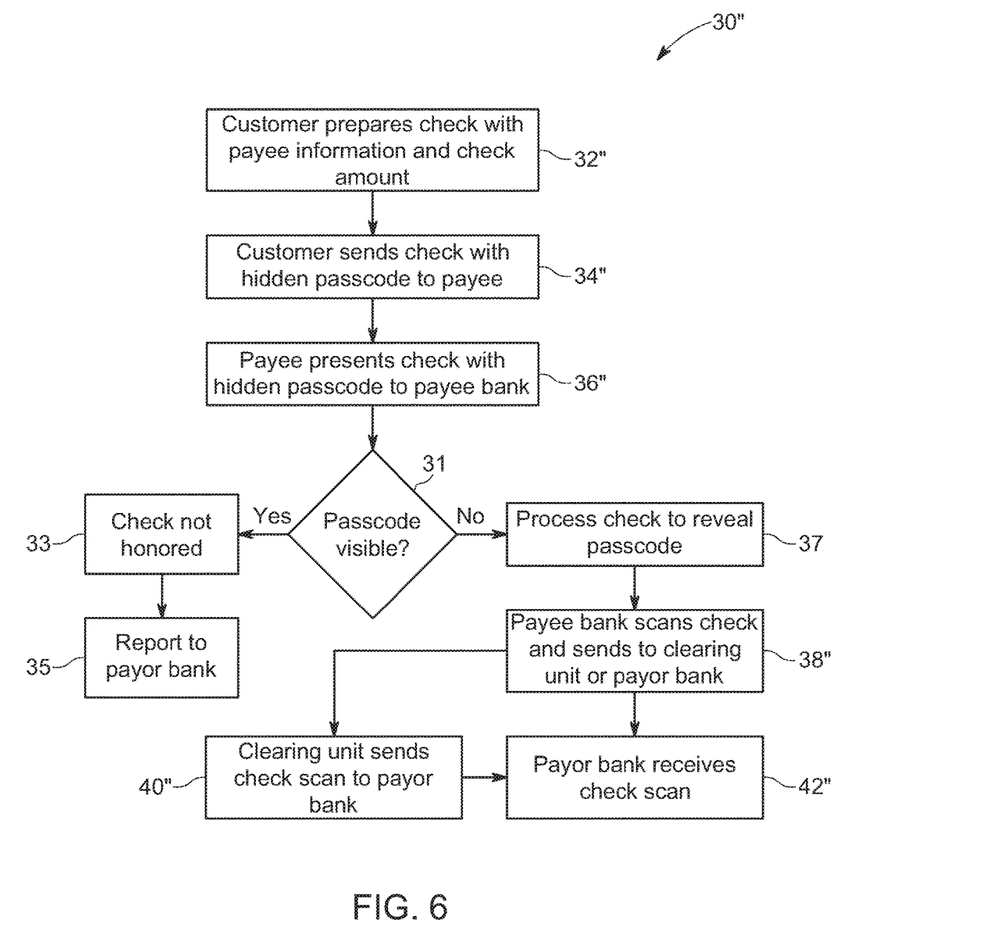
FIG. 6 is a flow diagram of a second phase of a check fraud prevention method according to the embodiment of the disclosure shown in FIG. 5.

Referring to FIG. 6, to make a payment via check and initiate the second phase of the check fraud prevention method, designated generally as 30", the customer/payor prepares a check with the necessary payee, date and payment amount information at step 32". To complete the check preparation process, the check is signed with an authorized signature or signatures when multiple signatures are required. The prepared check with printed invisible passcode is then sent to the payee at step 34". The payee endorses the check and presents the check to the payee's bank at step 36".

As an initial step, the payee bank inspects the check to determine if the passcode is visible at step 31. If the passcode is visible, the check is not honored at step 33. Optionally, the payee bank may report the potentially fraudulent check to the payor bank at step 35, and also may report optionally, the potentially fraudulent check to law enforcement and/or a check clearing unit, if one is involved in the check clearing process.

If the passcode is not visible on the check via a visual inspection, the check is processed to reveal the passcode at step 37. The invisible ink used to print the invisible passcode and the processing method used to render the ink visible illustratively may be of any type disclosed herein, or commonly known in the art, and may be standardized in the banking industry to promote efficient use of the invisible passcode system. Once the passcode has been made visible, the check is scanned, front and back, and sent either to a check clearing unit or to the payor's bank at step 38". If a check clearing unit is involved, the scan is sent to the clearing unit that forwards the scan to the payor bank at step 40"'. Whether sent directly from the payee bank, or indirectly from the check clearing unit, the payor bank receives the scan at step 42". This completes the second phase 30" of this aspect of the check fraud prevention method.

Similar to the first aspect of the disclosure, with this aspect of the disclosure, it should be noted that as an additional step, if the check does not appear to bear a passcode after processed to render any invisible ink visible, the payee bank can refuse acceptance of the check on the basis of invalidity. The check information can be reported to the payor bank, the customer/payor and/or to law enforcement for evaluation for potential fraud.

Figure 7:
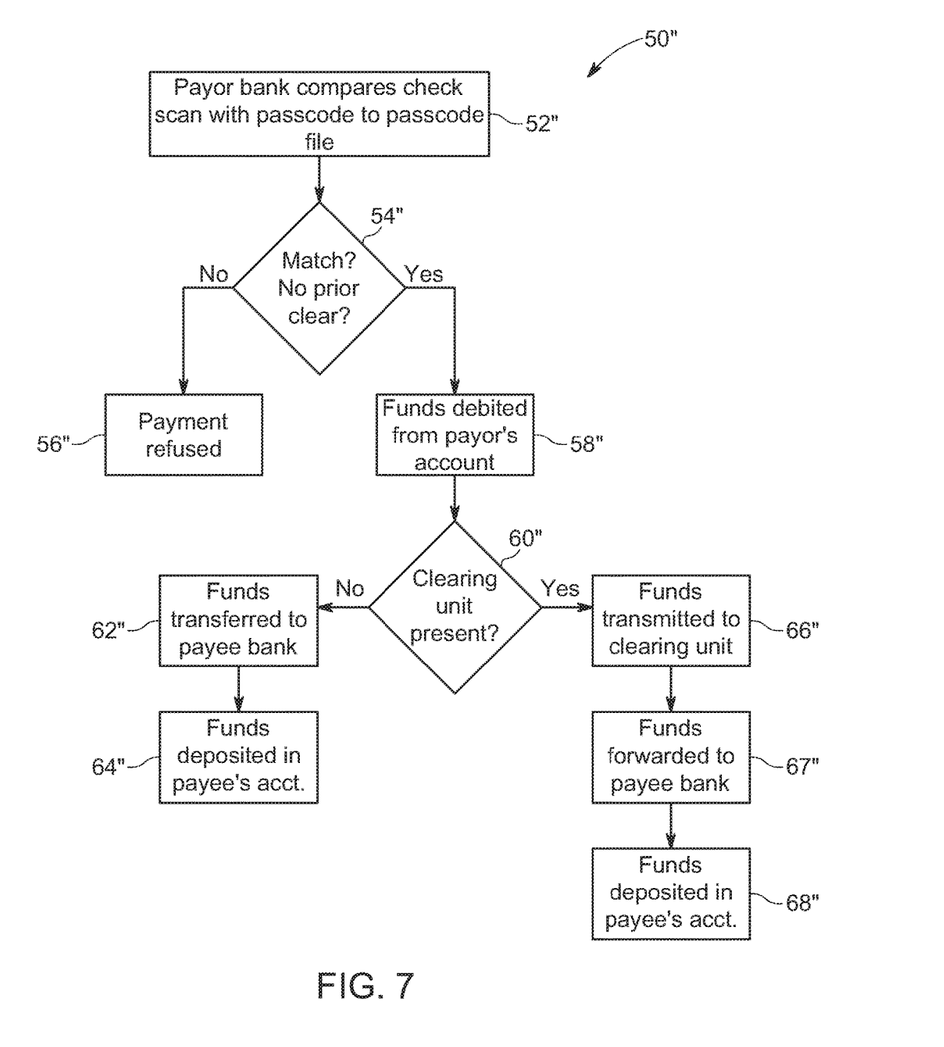
FIG. 7 is a flow diagram of a third phase of a check fraud prevention method according to the embodiment of the disclosure shown in FIG. 5.

Referring now to FIG. 7, to begin the third phase 50" of this second aspect of the check fraud prevention method, once the payor bank has the check number and passcode information, the payor bank makes a one-to-one comparison between the presented check's number passcode to the information stored in the passcode file retained by the payor bank at step 52". The comparison can be performed manually and/or via electronic means as disclosed herein for the first aspect of the disclosure. If there is a match at step 54", and all other indicia of validity are present, i.e., validated authorized signature(s), properly dated, payment amount filled out properly, check not used for prior payment transaction and sufficient funds in payor's account, funds can be debited from the payor's account at step 58". The funds can be debited electronically and sent either directly to the payee's bank for deposit into the payee's account at steps 62" and 64", if there is no clearing unit at step 60", or sent to the clearing unit that will forward the funds to the payee's bank at steps 66" and 67". The funds are then deposited into the payee's account at step 68". This completes the third phase 50" of this second aspect of the check fraud prevention method when the check is valid.

If the presented check with check number and passcode does not match the data on file, the payor bank can refuse payment at step 56" on the basis of an invalidated check and inform the clearing unit and/or the payee's bank. This complete the third phase 50" of this second aspect of the check fraud prevention method when the check is invalid. As an optional, additional step, the payor bank can also notify the check-issuing customer about the invalidated check to permit the customer to determine if the absence of a match is due to fraud or some error on the part of the payee. As previously disclosed, because each unique check number is connected to an invisible, unique random passcode, someone intending to commit check fraud simply cannot copy a check and change the check number as the new check number will not be connected to the passcode printed on the original check. This makes it impossible for fake checks to be created with fake check numbers.

Because the passcode is invisible and must remain so at the time of presentment, a fraud perpetrator cannot process the stolen check to reveal the passcode as that action would immediately invalidate the check. In addition, even with the passcode revealed, because the passcode is a randomized passcode, the fraud perpetrator cannot realistically modify the passcode also to create a new check number and invisible passcode combination as the new combination will not be on file with the payor bank, or with the payor.

For the embodiment that uses serialized checks, another fraud detection means is presented. Even if a check is presented for payment with an unprocessed invisible passcode, and with a valid check number/passcode combination, a presented and processed check with a check number significantly separated from checks cleared contemporaneously with the subject check can also be used as a basis to flag a potential fraud event. As previously stated, if a payor's bank has recently cleared checks numbering 1-20 and the bank is presented a check with 150 as the check number, the significant difference between the check's number compared to the recently validated and cleared check numbers can be used to flag the check as a potentially fraudulently issued check. If the account involved is a personal account with printed checks and wallet checks, each with different check number sequences, the method includes the step of comparing the check number of a subject check with the ranges of checks processed contemporaneously from both sets of checks to determine whether the subject check falls substantially out of the range of both check sets.

Figure 8:
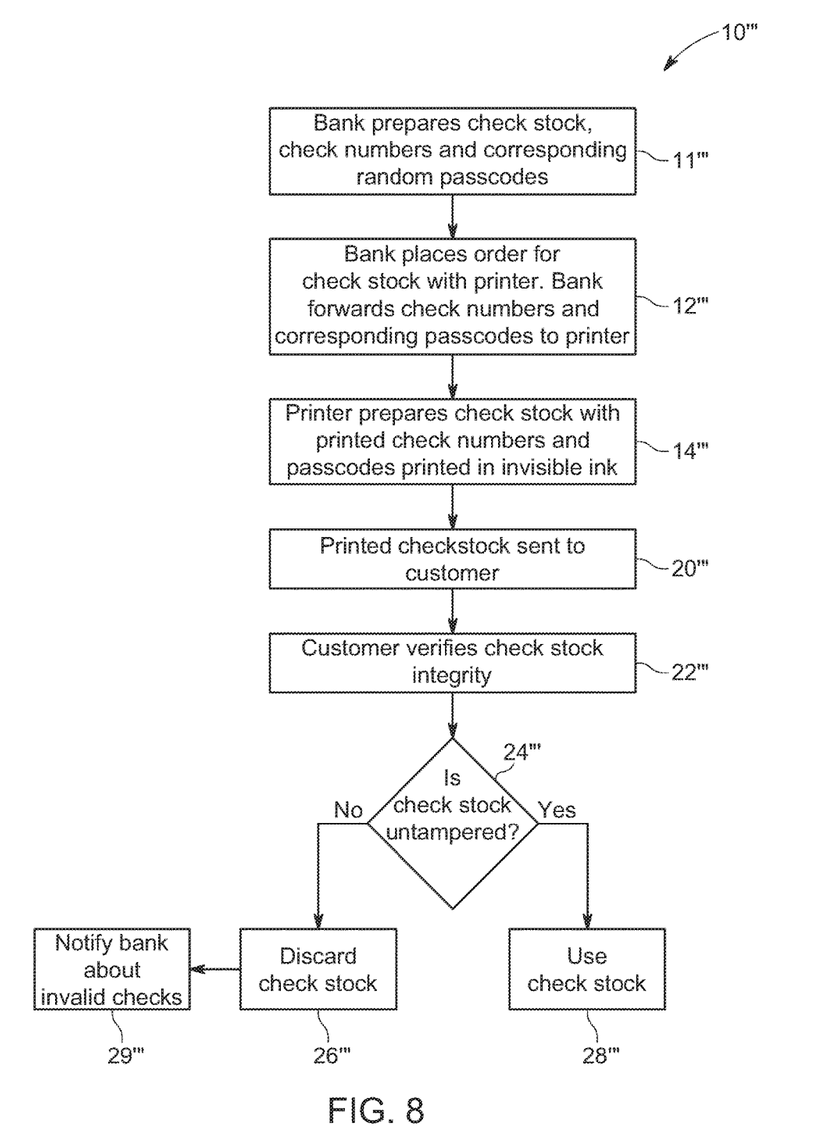
FIG. 8 is a flow diagram of a first phase of a check fraud prevention method according to yet another embodiment of the disclosure.

Referring now to FIG. 8, in another embodiment of the second aspect of the disclosure, the payor bank, rather than the customer, initiates the first phase of the check fraud prevention method, designated generally as 10'", by generating check numbers and random passcodes at step 11'" in the same manner as disclosed at step 14" of first phase embodiment 10". The random passcodes are generated in the same manner as disclosed in step 14" of the first phase embodiment 10".

Following preparation of the check numbers (serialized, un-serialized, or randomly serialized), and random passcodes, the bank orders check stock from a printer and forwards the check numbers and corresponding random passcodes to the printer at step 12'". The check stock is prepared by a check stock printer with check numbers and corresponding invisible passcodes printed on the checks at step 14'". The invisible passcodes can be printed on any part of the fronts or backs of the check stock as disclosed herein.

Once the check stock with invisible passcodes has been prepared, the printer forwards the check stock to the customer optionally in a tamperproof package at step 20'". Because the bank created the passcode file, the printer does not have to forward the file back to the customer's bank, or the bank's check processing center, other than to optionally verify that the checks have been printed.

Once the customer receives the check stock, the package is inspected to ensure the check stock has not been tampered with by any unauthorized party at steps 22'" and 24'". If the check stock appears to have been compromised, the check stock is discarded at step 26'" and the bank is notified, optionally, to discard, or disregard, the passcode file at step 29'". If the check stock is acceptable, the check stock is maintained for use at step 28'". This completes the first phase 10'" of this second embodiment of this second aspect of the check fraud prevention method.

The second and third phases of this second embodiment are identical to the second 30" and third 50" phases of the second aspect of the disclosure in FIGS. 6 and 7, respectively. The steps of the second and third phases of the second aspect of the disclosure are accordingly incorporated here as part of the disclosure of this second embodiment of this second aspect of the disclosure, the first phase of which is shown in FIG. 8.

To further eliminate check fraud events, the check fraud prevention method disclosed herein can be further enhanced with the use of a second randomized passcode. Unlike the first passcode, the second passcode is maintained physically separate from the check bearing a check number and the first randomized passcode (printed with either visible or invisible ink). In this aspect of the disclosure, the printer, bank, or customer/payor creates a second set of randomized passcodes with each passcode of the second set correlated to a single check number and correlated first passcode. The passcode file for this aspect of the disclosure (created by the bank, printer, or payor) will include a list of check numbers with first and second passcodes correlated to the check number. The passcode file is given to the customer and also given to the bank, if neither the bank nor the payor created the randomized passcode sets.

To use checks having the two sets of passcodes, the customer/payor fills out a check and sends the check to the payee. The check will bear the check number and the first passcode in either visible or invisible ink. The second passcode correlated to the check number of the issued check will be sent separately to the payee manually, e.g., by mail, and/or electronically, e.g., by email. Any delivery method that permits the passcode to be delivered separately from the check may be used and remain within the spirit and scope of the disclosure.

By way of illustration and not limitation, to obtain payment for the check, the payee presents the check to the payee's bank with the second passcode illustratively written next to the payee's endorsement signature on the back of the check (in similar fashion to when a check is endorsed to a third party with the phrase, "pay to the order of X", before the payee signature), or illustratively on a deposit slip, if used. If the second passcode is written on the check, the bank only has to follow its normal course of check presentment by either sending the physical check to an intermediary check clearing unit, if involved, or directly to the payor bank for validation and payment. If the passcode is separate from the check, the passcode also has to be sent, ultimately, to the payor bank for check validation.

If the check is scanned and the second passcode is written on the back of the check, the scanned check is sent electronically to the clearing unit and/or the payor bank. If the second passcode is on a separate piece of paper, such as the deposit slip, the deposit slip can be scanned and forwarded to the clearing unit and/or payor bank with the check, or the second passcode can be typed into the bank's computer system by the bank teller, and forwarded electronically to the payor bank.

To process the check for validity, the payor bank compares the check number and the two passcodes to the list of check numbers and passcodes in the passcode list. If there is a match and the check number has not been used for a previous payment transaction, and all other indicia of validity, e.g., proper authorized signature(s) and sufficiency of funds in the payor's account, funds are transferred to the payee's bank/payee's bank account. If there is no match, the check is invalid and payment is not made.

With the use of the second passcode, virtually all forms of check fraud can be prevented as any intercepted check, or even an unused check (with unique check number and first passcode) filled out without authorization, will not be valid without the second passcode. This second passcode method can be easily implemented industrywide as it does not require the use of any additional hardware or software and simply requires the added step of comparing one additional alphanumeric/special character sequence to a list of valid passcodes to validate a check. It also would facilitate significantly the tracking of check fraud as the perpetrator would have to have also intercepted the second passcode, or had access to the second set of passcodes, which likely would be a very small list of individuals.

In yet another aspect of the disclosure to eliminate check fraud events, the check fraud prevention method disclosed herein can be modified to use a single randomized passcode maintained physically separate from the check bearing a unique check number. In this aspect of the disclosure, the printer or bank creates a single set of randomized passcodes with each passcode correlated to a single check number. The passcode file created by the printer, bank or customer/payor for this aspect of the disclosure will include a list of check numbers with a single set of passcodes, each correlated to a single check number. The passcode file is given to the customer and also given to the bank, if the bank or the customer did not create the passcode file.

To use checks with a physically separate passcode, the customer/payor fills out a check and sends the check to the payee. The check will bear the unique check number, but no passcode in either visible or invisible ink. The passcode correlated to the check number of the issued check will be sent separately to the payee manually, e.g., by mail, and/or electronically, e.g., by email. Any delivery method that permits the passcode to be delivered separately from the check may be used and remain within the scope and spirit of the disclosure. For this aspect of the disclosure, the passcode should be maintained separate from the check until the payee receives the check.

To obtain payment for the check, the payee presents the check to the payee's bank with the correlated passcode illustratively either written next to the payee's endorsement signature on the back of the check, or on a deposit slip, if used. If the passcode is written on the check, the bank only has to follow its normal course of check presentment by sending the physical check to an intermediary check clearing unit, if involved, or directly to the payor bank for validation and payment. If the passcode is separate from the check, such as on the deposit slip, the passcode also has to be sent, ultimately, to the payor bank via any delivery method including mail, or scanning and electronically forwarding the deposit slip to the check clearing unit and/or payor bank. Deposit slips are often scanned when a deposit is made so this aspect of the disclosure would not require any additional action on the part of the payee bank to implement this aspect of the check fraud prevention method.

If the check is scanned and the correlated passcode is written on the back of the check, the scanned check is sent electronically to the clearing unit and/or the payor bank. If the passcode is on a separate piece of paper, such as the deposit slip, the deposit slip can be scanned and forwarded to the clearing unit and/or payor bank with the check, or the passcode can be typed into an electronic file by a bank teller and forwarded electronically to the check clearing unit and/or payor bank.

To process the check for validity, the payor bank compares the check number and the correlated passcode to the list of check numbers and passcodes in the passcode list. If there is a match and the check number has not been used for a previous payment transaction, and other indicia of validity are present as disclosed herein, funds are transferred to the payee's bank/payee's bank account. If there is no match, the check is invalid and payment is not made.

With the use of the physically separate passcode, virtually all forms of check fraud can be prevented as any intercepted check, or even an unused check (with unique check number) filled out without authorization, will not be valid without the correlated passcode. This single, physically separate passcode method can be easily implemented industrywide as it does not require the use of any additional hardware or software and simply requires the comparison of an alphanumeric/special character sequence to a list of valid sequences to validate a check. It also would facilitate significantly the tracking of check fraud as the perpetrator would have to have also intercepted the passcode, or have access to a payor's passcodes, which likely would be a very small list of individuals.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What I claim as new and desire to secure by United States Letters Patent is:

1. A method to prevent check fraud comprising the steps of:
   printing a plurality of checks with unique check numbers printed on each check of the plurality of checks;
   generating a plurality of randomized passcodes to create a series of randomized passcodes;
   selecting randomized passcodes from the plurality of randomized passcodes and printing each of the plurality of the randomized passcodes on only one of the plurality of checks;
   correlating the check number and the randomized passcode on each of the plurality of checks to create a list of correlated check numbers and passcodes;
   creating a passcode file with the list of correlated check numbers and passcodes derived from the plurality of checks;
   presenting one of the plurality of checks for payment, wherein the presented check has a unique check number and passcode combination;
   comparing the check number and passcode of the presented check with the correlated check numbers and passcodes in the passcode file to determine validity of the presented check; and,
   determining whether the correlated check number and passcode combination was used in a prior check clearing or payment event.

2. The method of claim 1 wherein the passcode can be printed on a front, a back, or both the front and the back of the check.

3. The method of claim 1 wherein the checks are printed with serialized check numbers.

4. The method of claim 1 wherein the checks are printed with un-serialized check numbers.

5. The method of claim 1 wherein the presented check is scanned.

6. The method of claim1 further comprising the step of a bank ordering the plurality of checks to be printed.

7. The method of claim 6 wherein the check numbers are serialized.

8. The method of claim 6 wherein the check number are un-serialized.

9. A method to prevent check fraud comprising the steps of:
   printing a plurality of checks with unique check numbers printed on each check of the plurality of checks;
   generating a plurality of randomized passcodes to create a series of randomized passcodes;
   selecting randomized passcodes from the plurality of randomized passcodes and printing each of the plurality of the randomized passcodes on only one of the plurality of checks in invisible ink;
   correlating the check number and the randomized passcode on each of the plurality of checks to create a list of correlated check numbers and randomized passcodes;
   creating a passcode file with the list of correlated check numbers and randomized passcodes derived from the plurality of checks;
   presenting one of the plurality of checks for payment, wherein the presented check has a unique check number and passcode combination;
   processing the presented check to render the invisible passcode visible;
   comparing the check number and the visible passcode of the presented check with the correlated check numbers and passcodes in the passcode file to determine validity of the presented check; and,
   determining whether the correlated check number and passcode combination was used in a prior check clearing or payment event.

10. The method of claim 9 wherein the passcode can be printed on a front, a back, or both the front and the back of the check.

11. The method of claim 9 wherein the checks are printed with serialized check numbers.

12. The method of claim 9 wherein the checks are printed with un-serialized check numbers.

13. The method of claim 9 wherein the presented check is scanned.

14. The method of claim 9 wherein a bank orders checks to be printed with each check printed with a single check number and a single randomized passcode.

15. The method of claim 14 wherein the check numbers are serialized.

16. The method of claim 14 wherein the check number are un-serialized.

17. A method to track check fraud consisting of the steps:
   providing a check with a check number and a randomized passcode correlated to the check number to create a unique check number/passcode combination, wherein the check number and passcode are both printed on the check;
   creating a passcode file that includes the check number and the randomized passcode correlated to the check number;
   issuing the check to a payee;
   presenting the check to a bank for payment;
   comparing the check number and the passcode on the presented check with the check number and the passcode listed in the passcode file to determine check validity for a single use of the check;
   determining the check is invalid;
   tracking down a fraud perpetrator by tracking a chain of custody for the check using the passcode.

18. The method of claim 17 further comprising the step of starting the fraud tracking step with an intended payee.

19. The method of claim 18 further comprising the step of determining whether the intended payee received the check.

20. The method of claim 19 further comprising the step of determining the payee received the check and focusing the fraud investigation to events occurring after the intended payee received the check.

* * * * *